Oct. 9, 1928.  
G. C. DEAKINS  
PUMP VALVE  
Filed Sept. 30, 1925  
1,687,008
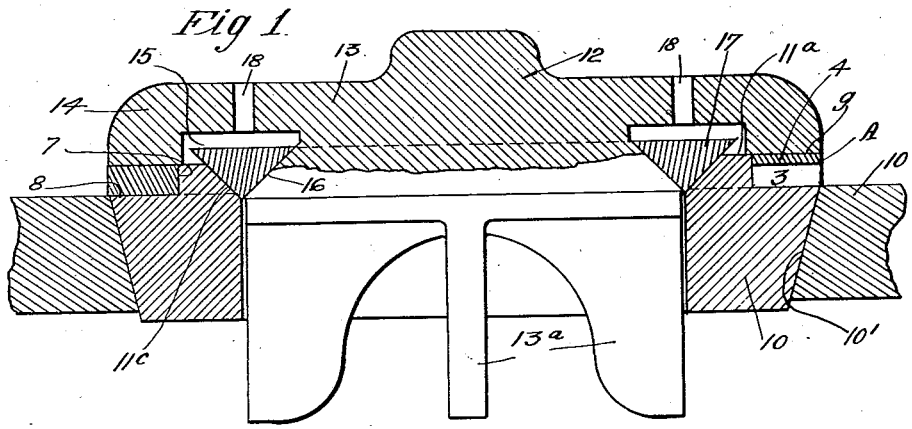
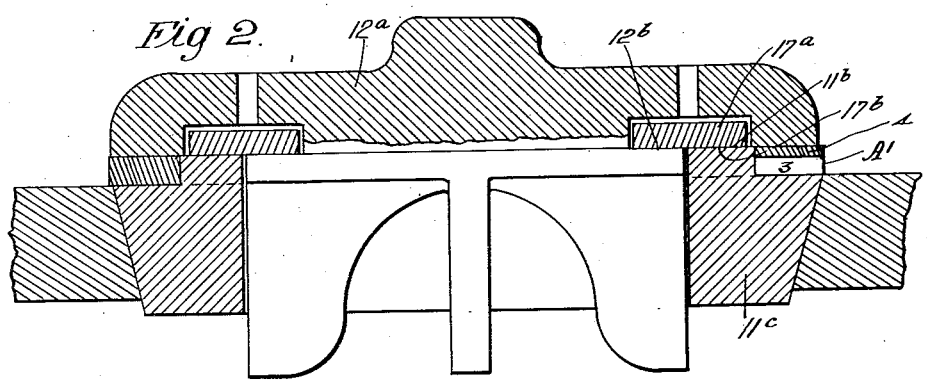
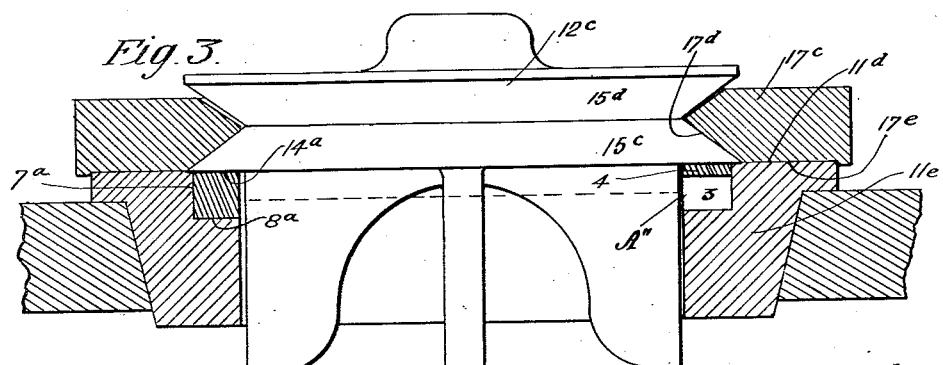
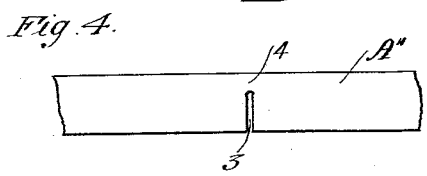
Inventor.
Grover C. Deakins
Attorney.

Patented Oct. 9, 1928.

1,687,008

UNITED STATES PATENT OFFICE.

GROVER C. DEAKINS, OF ANAHEIM, CALIFORNIA.

PUMP VALVE.

Application filed September 30, 1925. Serial No. 59,504.

This invention relates generally to valves, and although the specific and illustrative embodiment of the invention herein set out has been particularly designed for use in connection with pumps operating at considerable pressure, it will be readily understood that the invention is not at all limited to such uses. It will be helpful, however, to describe the illustrated embodiment of the invention as used in pumps operating under some considerable pressure and also particularly where the fluid is liable to cut the valves; for from such description the invention itself will be most readily understandable.

In pumps used for circulating fluid during the operation of drilling oil wells by the rotary method, the fluid pumped carries in suspension a large amount of finely divided solid; in fact, as is well known, it is the circulation of this water that carries the drillings out of the well. The mud-laden fluid is also used for sealing the wall of the bore. In order to keep up circulation, the pumps are operated at comparatively high pressures, for instance at 400 pounds per square inch, and this high pressure exerting itself upon the valves causes them to seat so heavily that the finely divided solid matter carried by the water is pressed into the valves, abrading them so that as a rule such valves have a comparatively short life and must be often renewed.

The standard type of valve that has been heretofore used has usually embodied a valve disk of some four or five inches in diameter, that seats on its under side and near its periphery on a valve seat ring. The total pressure exerted upon a valve disk of that diameter to press it onto its seat is very great, and, due to the-fact that the circulation water carries solids in suspension, it is necessary that the disk be made of some material that will seat tightly in spite of the unavoidable presence of a certain amount of this finely divided solid matter between it and the seat; and the resultant necessary limitations of the material used in the disk render it easily scored and abraded.

I have provided a simple and practicable form of valve that, although it may have the same diameter and capacity as previous valves, relieves the seating or sealing portions of the valve from the heavy pressures to which they have formerly been subjected. Generally speaking, I accomplish this by making the valve proper in two parts, one part of which may be termed a valve body and the other the sealing member or ring; the two being constructed and arranged so that the valve body (which is not depended upon for any sealing effect) takes the major portion of the pressure while the sealing member or ring takes only such pressure as is necessary to bring it into good seating and sealing contact with the seating surface.

Such provision, however, brings about certain conditions which are non-existent in usual valve constructions and call for remedial measures. In the usual valve, the disk is necessarily of such material that its intermittent engagement with the valve seat does not cause excessive seat wear. In the preferred embodiment of my invention, however, the body part of the valve, which part, as I have explained above, takes the major portion of the pressure, is made of steel and it contacts with the seat each time the valve is closed in order to space it from the sealing member so the latter may not be compressed by said body part. As a consequence, the body part causes considerable wear on the valve seat which is usually made of cast iron. This results in the necessity of replacing seats with comparatively great frequency, a necessity which spells economic loss due to the cost of labor and replacement materials as well as to periods of pump idleness.

I offset this situation by providing the valve seat with wear rings of tough steel or other material having suitable wear resisting qualities, these rings being adapted to take the thrust of the valve body. The rings are secured to the seat in any suitable manner and may be replaced, when overworn, without discarding the entire seat.

The following description sets forth in detail a preferred and specific illustrative embodiment of the invention, reference being had for this purpose to the accompanying drawings, in which:

Fig. 1 is a section, partly in elevation of one form of the improved valve;

Fig. 2 is a similar view of a modified form;

Fig. 3 is a similar view of another modified form; and

Fig. 4 is a fragmentary elevation of a preferred form of wear ring.

It will be understood that in giving a detailed description of the preferred forms of the valve, I do so not for the purpose of limiting my invention to such specific and preferred forms, but for the purpose of giving a clear and full understanding of the invention through the medium of a full and detailed understanding of specific forms thereof.

Referring first to the form shown in Fig. 1 of the drawings, there is illustrated a member 10 which forms a part of the stationary structure of the pump, being what is ordinarily known as the valve plate. This plate forms, in effect, one wall of the valve chamber in a pump, and usually there is inserted in this plate a removable valve seat 11 made of a suitable selected material, preferably cast iron. Ordinarily, seat 11 is tapered and has a tight press fit with complementary bore 10′ in plate 10. However, considering the invention in its broader aspects, parts 10 and 11 may be considered as forming the relatively stationary part of the valve and providing a seat upon which the sealing member or ring is seated when the valve is closed.

In the form shown in Fig. 1 the valve body 12 is made up somewhat in the usual manner excepting that I prefer to make the head or head flange 13 and the guide portions 13ᵃ integral instead of in two pieces, as is usually the case. This, however, is not necessary, although the integral structure of the valve body eliminates all liability of the otherwise separate parts becoming loosened. Body 12 is made of steel or other material having suitable wear resisting qualities and has at its periphery a downwardly facing peripheral flange 14. Immediately within this peripheral flange there is an annular recess 15, the outer wall of the recess being formed by the overhanging flange 14 and the inner wall of the recess being, in the form of Fig. 1, an angular or conical surface 16. When the valve is closed the parts are in the relative positions shown in Fig. 1; and the conical face 16 extends to a point below the upper flat face 11ᵃ of valve seat 11. The inner upper corner or edge of valve seat 11 is beveled away to form a conical face 11ᶜ, as illustrated; and the two beveled conical faces 11ᶜ and 16 take between them the sealing ring 17, which has its under side or surface formed with two conical faces corresponding in angularity to the faces 11ᶜ and 16.

Ring 17 is preferably somewhat loose in recess 15; or at least loose to the extent that it may move vertically (assuming the action of the valve body to involve vertical movement to and from the seat). The sealing ring may or may not be loose radially when it is not under pressure and thus not confined between the conical faces 11ᶜ and 16. Openings 18 allow fluid pressure to enter recess 15 and press against the upper surface of sealing ring 17.

The upper end of seat 11 has an annulus 7 about which is tightly fitted a wear or thrust ring A, the under face of which engages annular shoulder 8 of the seat. The upper face 9 of the ring is preferably flush with face 11ᵃ but may be somewhat thereabove without interfering with the proper operation of the device. Of course, if the seating face of the valve body is "stepped," ring A may be on any of its steps. Ring A is made of tough steel or other material having wear resisting qualities of a superior nature. It lies within the scope of my invention to hold the ring to the seat by means other than a force fit, but the type of securement is preferably such that the ring may be removed for replacement without damaging or unduly mutilating the seat.

When the valve is in operation the greater part of the fluid pressure is borne by the valve body itself, this pressure being supported by the seating of flange 14 on ring A. As the valve moves down to close, sealing ring 17 is more or less loose in its recess 15; and when the valve is closed it will be seen that the only pressure exerted directly upon the sealing ring is the fluid pressure exerted directly upon its upper face. Such pressure is only a small fraction of the total fluid pressure exerted upon the whole valve; but that comparatively greatly reduced pressure is amply sufficient to hold the sealing ring down in fluid tight engagement with the two surfaces 11ᶜ and 16. The valve body itself thus takes the major portion of the pressure load; and although solid particles may constantly find lodgment between seating flange 14 and seat 11 or ring A, their presence is of no great consequence in the operation of the valve, as it is not at all necessary that a fluid tight engagement be formed where the flange 14 seats on seat 11 or ring A. Neither is their presence of any great consequence as regards wear, because the valve body 12 as well as ring A is constructed of a suitable material hard and tough enough not to be materially worn by the solid particles.

Whether or not fluid carrying matter in suspension is being pumped, the valve still has certain advantages due to relief of pressure from the sealing element. It is not only the presence of suspended abrading matter that causes deterioration of valves, but also such deterioration is caused by the valves pounding upon their sealing surfaces under the great pressures imposed. In my valve all these pounding effects are most largely taken by the valve body and ring A upon which no dependence is placed for sealing, and very little is taken by the sealing ring. In valves that are subjected to nothing but clear liquid, the sealing ring 17 may be made of any suitable material, of suitable metal for instance. But in typical instances where solids in suspension are passing through the valve, it is necessary, as before stated, that one or the other of the members that by their contact seal the valve, shall be made of a material that can yield sufficiently to form an effective seal in spite of the presence of solid particles. In such a case, I prefer to make sealing ring 17 of rubber or suitable rubber composition or similar material; in general, of a material that is yielding and, preferably, resilient.

In Fig. 2 the structure illustrated is similar to that shown in Fig. 1 with the exception that sealing ring 17ª here has a flat under face 17ᵇ that seats partially upon the flat upper face 11ᵇ of seat 11 and partially upon a flat upwardly facing annular surface 12ᵇ of valve body 12ª. The action of this form of valve is substantially the same as previously described, the only difference being that in the form of Fig. 1 the sealing ring 17 is by pressure action more or less wedged into its sealing engagement with the conical faces 11ᶜ and 16, whereas in the form of Fig. 2 the sealing ring 17ª is directly pressed, without any wedging action, against the faces 11ᵇ and 12ᵇ. Seat 11ᶜ has a wear ring A' similar to and performing the same functions as ring A.

In the form shown in Fig. 3 the annular recess in valve body 12ᶜ is in the form of a peripheral groove having a lower conical or angular wall 15ᶜ. The upper wall 15ᵈ of this groove may also be similarly conical; and the sealing ring 17ᶜ is seated, preferably more or less loosely, in this annular groove with an inner, lower conical face 17ᵈ adapted to seat on face 15ᶜ. The sealing ring also has, exterior of the valve body, a flat downwardly facing sealing face 17ᵉ that seats upon the upwardly facing flat sealing face 11ᵈ of seat 11ᵉ. The valve body here takes the major portion of the imposed pressure by its downwardly facing peripheral surface 14ª, seating upon the inner part of upper face 11ᵈ of seat 11ᵉ and upon wear ring A" which is pressed to seat in groove 7ª and against annular shoulder 8ª. The action of this valve is substantially similar to that of the forms before described, the valve body taking the major part of the pressure while the sealing ring takes only that part of the pressure which is directly imposed upon it. In every case, the proportionate pressures taken by the valve body and sealing ring depend upon their proportionate areas exposed to the fluid pressure at the outlet or delivery side of the valve. In the form of Fig. 3, as in the other forms, sealing ring 17ᶜ is preferably somewhat loosely mounted in its receiving recess, or at least loosely to the extent that it may move vertically with reference to the valve body. This looseness of mounting in all of the forms does not necessarily mean that the sealing rings can be loosely moved by hand or by ordinary pressures or force. For instance, the rings, if made of rubber, may be expanded to be put into place and they may grip the inner walls of their receiving recess more or less tightly; but when the heavy operating pressures are put upon their upper faces, they can move downwardly into engagement with their conical seating surfaces because, being expansible, they will expand sufficiently to allow them to move bodily downwardly with reference to the valve body. Of course, in cases where the sealing rings may be made of a comparatively unexpansible material, such as metal, the sealing ring could not, particularly in the form of Fig. 3, fit tightly radially into the angular wall recess groove. In Fig. 3 the rubber ring may overhang the edge of the seat so that, under pressure, it will more or less conform around the edge corner of the seat, thus making a tighter joint and holding fluid pressure even though foreign matter may be beneath the rubber sealing member.

I have mentioned above that the various wear rings preferably have force fit with their associated seats. In order that they may be more easily removed for replacement, especially when they have become rusted in, I may fashion the rings with a downwardly opening transverse slot 3, leaving a relatively frangible portion 4 at the upper or wear edge. When occasion arises for removing the ring, and at such a time portion 4 will ordinarily be worn down very considerably, the operator may with little effort cut through the frangible portion with a cold chisel, for instance, and thereupon remove the ring with ease. In some instances the frangible portion may be entirely worn away before the operator's attention is called to the necessity of replacing a given ring. It will be understood, however, that the provision of a relatively frangible portion is not essential to the invention, considered in its broader aspects, and, therefore, the showing and description of this feature is not to be considered as limitative on such of the appended claims as do not specify it.

It will be understood the drawings and description are to be considered merely as illustrative of and not restrictive on the broader claims appended hereto, for various changes in design, structure and arrangement may be made without departing from the spirit and scope of said claims.

I claim:

1. In a valve, a relatively stationary part including a relatively soft seat member, a movable valve body, a relatively soft sealing member carried by the body, and a detachable relatively hard member having tight fit on the stationary part and underlying the valve body, said relatively hard member having a relatively frangible portion adapted to be broken away to relieve the last-mentioned member from its tight fit with the stationary part, said body being adapted to seat on said hard member, and said sealing member being adapted to seat on the body and stationary part.

2. In a valve, a relatively stationary element including a seat member, a movable valve element, a relatively soft sealing member carried by the valve element and adapted to seat on the seat member, and a detachable relatively hard member having tight fit with one of said elements and adapted to engage a relatively soft portion of the other member when the sealing member is seated, said relatively hard member having a relatively frangible portion adapted to be broken away to relieve said relatively hard member from its tight fit with said one element.

In witness that I claim the foregoing I have hereunto subscribed my name this 24th day of September, 1925.

GROVER C. DEAKINS.